(12) United States Patent
Teraue

(10) Patent No.: US 6,943,915 B1
(45) Date of Patent: Sep. 13, 2005

(54) COLOR CONVERSION METHOD, COLOR CONVERSION APPARATUS AND COLOR CONVERSION DEFINITION STORAGE MEDIUM

(75) Inventor: Eiji Teraue, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 981 days.

(21) Appl. No.: 09/661,262

(22) Filed: Sep. 13, 2000

(30) Foreign Application Priority Data

Sep. 14, 1999 (JP) .................................. 11-259831

(51) Int. Cl.⁷ ............................ G06F 15/00; G06K 9/00
(52) U.S. Cl. ........................................ 358/1.9; 382/162
(58) Field of Search ................................ 358/1.9, 1.13;
347/15, 43; 382/162, 166; 345/548, 593;
399/23, 237, 298, 299

(56) References Cited

U.S. PATENT DOCUMENTS

| | | | | |
|---|---|---|---|---|
| 5,710,577 A | * | 1/1998 | Laumeyer | 345/548 |
| 5,949,427 A | * | 9/1999 | Nishikawa et al. | 345/593 |
| 5,995,653 A | * | 11/1999 | Reed et al. | 382/162 |
| 6,044,172 A | * | 3/2000 | Allen | 382/166 |
| 6,178,008 B1 | * | 1/2001 | Bockman et al. | 358/1.9 |
| 6,252,676 B1 | * | 6/2001 | Azima et al. | 358/1.9 |
| 6,429,947 B1 | * | 8/2002 | Laverty et al. | 358/1.15 |
| 6,449,060 B1 | * | 9/2002 | Kawai et al. | 358/1.9 |
| 6,456,395 B1 | * | 9/2002 | Ringness | 358/1.9 |
| 6,516,089 B1 | * | 2/2003 | McCann et al. | 382/166 |
| 6,519,050 B1 | * | 2/2003 | Eintracht et al. | 358/1.15 |
| 6,526,244 B1 | * | 2/2003 | Viturro et al. | 399/237 |
| 6,529,202 B2 | * | 3/2003 | Wu | 345/593 |
| 6,559,975 B1 | * | 5/2003 | Tolmer et al. | 358/1.9 |
| 6,607,258 B2 | * | 8/2003 | Jodra et al. | 347/15 |
| 6,633,666 B2 | * | 10/2003 | Gill et al. | 382/162 |
| 6,637,849 B2 | * | 10/2003 | Maltz | 347/15 |
| 2001/0028471 A1 | * | 10/2001 | Hirokazu | |
| 2002/0008880 A1 | * | 1/2002 | Dewitte et al. | |
| 2002/0149644 A1 | * | 10/2002 | Jodra et al. | |
| 2003/0043393 A1 | * | 3/2003 | Iwasaki | |

FOREIGN PATENT DOCUMENTS

JP        10-248017        9/1998 .............. H04N 1/60

OTHER PUBLICATIONS

Patent Abstract of Japan 10248017 Sep. 14, 1998.

* cited by examiner

Primary Examiner—Madeleine Nguyen
(74) Attorney, Agent, or Firm—Sughrue Mion, PLLC

(57) ABSTRACT

Printing image data is converted into image data for a proofer through a print condition conversion process for converting CMYK for printing into L*a*b*, a spot color reference process for converting a spot color name into L*a*b*, a printer condition conversion process for converting L*a*b* into RGB for proof, and a composition process for synthesizing a process color with a spot color.

12 Claims, 12 Drawing Sheets

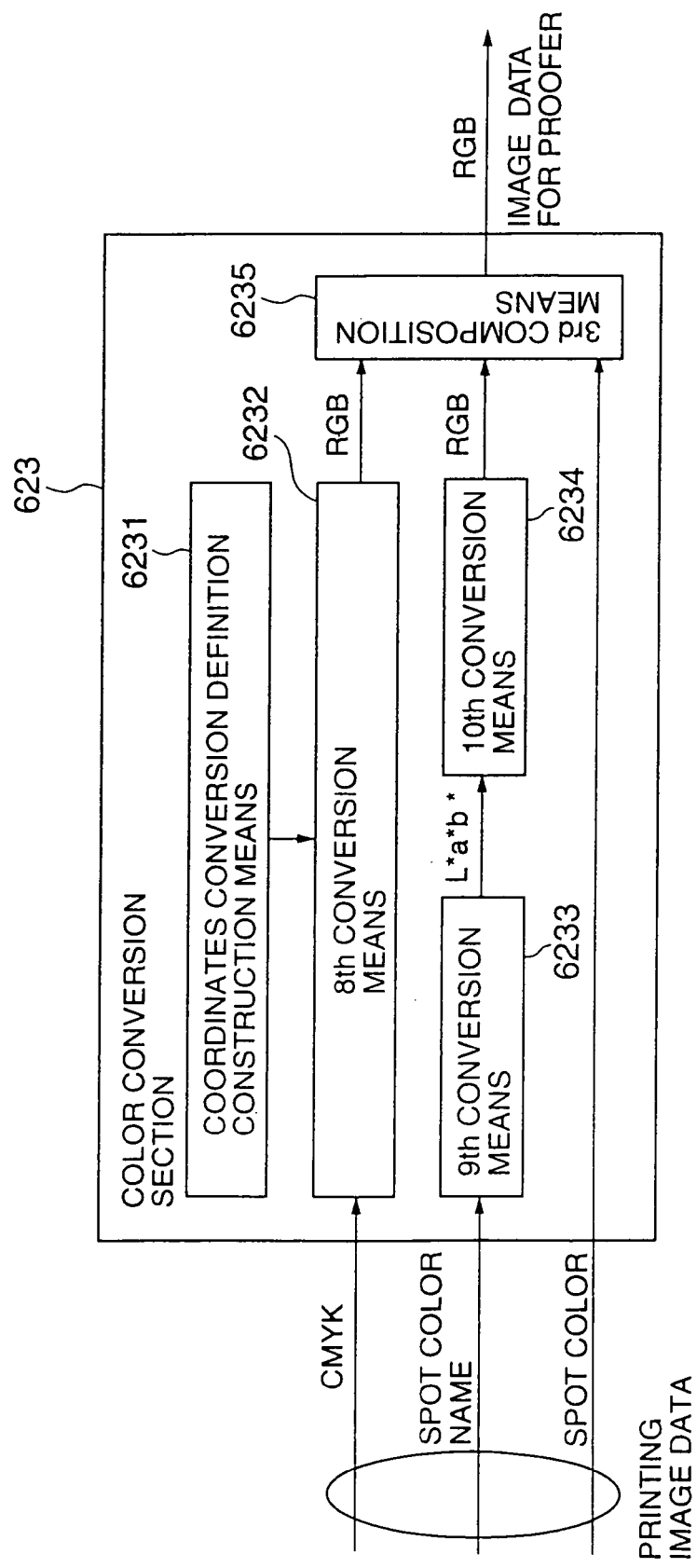

COLOR CONVERSION METHOD, COLOR CONVERSION APPARATUS AND COLOR CONVERSION DEFINITION STORAGE MEDIUM

BACKGROUND OF THE INVENTION

1. Field of the Invention

The present invention relates to a color conversion method of converting image data for printing to image data for a proofer, a color conversion apparatus and a color conversion definition storage medium for storing therein a color conversion definition to perform such a color conversion, which are applied to a system wherein when a color printing is performed by a color printing machine using a spot color ink as well as a process color ink, a proofer such as a printer or a CRT display unit is used to output a proof image representing a color of a color printed matter (including print-out and image display).

2. Description of the Related Art

Hitherto, in the event that a color printing machine is used to perform a color image printing, before the printing is performed, a proof image, which is similar in color to the utmost to the same color as a color of an image printed by the color printing machine, is printed out using a color printer and the like, or alternatively displayed on a screen of a color display unit. In the event that such a proof image is produced, there are detected a print profile describing a relation between image data and colors of actual printing matters, which print profile is associated with a type of a printing machine for the intended printing and using conditions of the printing machine (conditions necessary for some printing, including a sort of ink to be used and a quality of a printing paper; and a type of a printing machine, are referred to as printing conditions), and a proofer profile describing a relation between image data and colors of actually outputted proof images, which proofer profile is associated with a type of a proofer outputting proof images and using conditions of the proofer (conditions necessary for outputting of some proof image, including a type of a proofer, are referred to as proof conditions), and then the image data for printing is converted to the image data for the proofer in accordance with the print profile and the proofer profile, so that a proof image is outputted in accordance with the converted image data for the proofer. Thus, it is possible to obtain the proof image that coincides with the actual printing matter in color. Usually, the print profile associated with the typical printing conditions is offered from a printer (a printing service trader), and the proofer profile is also offered, with respect to printers (devices) for the purpose of a proof image output, from a maker of the printers.

In the event that the image data for printing is converted into the image data for a proofer to output the proof image, usually, the print profile and the proofer profile are combined to produce a LUT (Look Up Table), and the LUT is referred to and regarding a low order bit side on which the LUT fails to describe the association, an interpolation arithmetic operation is performed, so that the image data for printing is converted into the image data for the proofer.

Here, printing is performed usually using process color ink of four colors of CMYK, but in some case it happens that spot color ink is used in addition to the process color ink of those four colors. In this case, it is not realistic that there is prepared a print profile on the combination of the process color ink of four colors of CMYK and the various sorts of spot color ink in its entirety, and usually, there is prepared a print profile related to the printing using the process color ink of four colors of CMYK. Accordingly, the LUT thus produced is an LUT in which process color image data defined by color spaces of four colors of CMYK wherein the process color ink of four colors of CMYK is used to perform printing is converted into image data defined by color spaces of three colors of RGB wherein color materials of, for example, three colors of RGB is used to output a proof image for proofer.

In the situation as mentioned above, when the printing is performed using the spot color ink as well as the process color ink of four colors of CMYK, it is a problem as to how the proof image of the printed matter is outputted.

Usually, a printer for a proof image output is of a type of outputting an image through for example, color materials of three colors of RGB or color materials of four colors of CMYK, and it is extremely rare that spot color materials coincident with spot colors intended for use of the printing are prepared. Further, also in the event that a proof image is displayed on a CRT display unit, there is no way other than all the colors being represented by a combination of three colors of RGB. Thus, the printed matter including the spot color will be represented by three colors of RGB in its entirety.

In this case, according to the earlier technology, there is adopted a method in which spot color image data is converted into process color image data of four colors of CMYK in accordance with characteristics (coordinate values on the L*a*b* space and the like) of characteristic ink to be used for intended printing, which is available from a maker of the characteristic ink, and image data (dot % data and the like) for spot color for printing, the process color image data for spot color and the process color image data for process color ink of four colors of CMYK except the spot color are combined, and the combined process color image data of four colors of CMYK is converted by the conversion system such as the LUT into, for example, image data of three colors of RGB, for a proofer, so that a proof image is outputted based on the image data for the proofer thus converted. In this case, the spot color is separated into four colors of CMYK, and is converted into the image data for the proofer by the conversion system comprising the LUT as mentioned above for the process color. Thus, this is a problem in accuracy of color reproduction of the spot color.

In Japanese Patent Application Laid Open Gazette Hei. 10-248017, there is proposed a technology in which accuracy of color reproduction of the spot color is improved. According to the technology, of the printing image data, the process color image data of four colors of CMYK is converted into process color image data for a proofer by a first conversion system comprising the LUT as mentioned above, and on the other hand, as to a spot color, there is prepared a second conversion system adapted for the spot color, and image data for the spot color is converted into image data for the proofer by the second conversion system. Both the image data converted by the first and second conversion systems are combined on a color space (e.g. RGB color space) for the proofer.

According to such a technology, as compared with the above-mentioned earlier developed technology in which the spot color is separated and is converted by the conversion system which is not prepared as one for a spot color, there is prepared a second conversion system adapted for the spot color as well as a first conversion system adapted for the process color ink of four colors of CMYK. Thus, it is possible to perform a color conversion with greater accuracy as to the spot color and thereby improving the color reproduction accuracy of the spot color.

Now let us consider a case where there is constructed such a system that various types of proofers for a proof image output exist, and of the various types of proofers, a proofer for outputting a proof image is selected in accordance with, for example, speed and cost for producing the proof image. That is, for example, a system in which a proof image is displayed on a display screen of a CRT display unit and is printed out by a printer as a need arises. In addition, for printing out, there are prepared a plurality of printers, one of which is a printer for proof image output that is selected in accordance with speed and cost for print output, or necessary image quality. In this case, according to the technology proposed in the above-mentioned Japanese Patent Application Laid Open Gazette Hei. 10-248017, there is a need to do over again producing both the first conversion system and the second conversion system for each type of the proofer. This is a problem in efficiency of data management. Alternatively, it is possible to prepare both the first conversion system and the second conversion system for each type of the proofer beforehand. However, each of the first conversion system and the second conversion system includes an extremely large LUT which needs a large capacity of memory. A preparation of the conversion system requiring such a large capacity of memory in accordance with a type of the proofer needs a very large capacity of memory. This is a problem from the view point of structure of the system and the cost.

SUMMARY OF THE INVENTION

In view of the foregoing, it is an object of the present invention to provide a color conversion method adapted to a system which is high in accuracy of the color reproduction of the spot color, wherein a plurality of types of proofers each for outputting a proof image, a color conversion apparatus and a color conversion definition storage medium for storing therein a color conversion definition suitable for such a color conversion.

To achieve the above-mentioned object, the present invention provides a color conversion method of converting printing image data, which comprises process color image data defined by a coordinate value of a predetermined first color space, and spot color image data defined by a coordinate value of a characteristic direction, into image data defined by a coordinate value of a predetermined second color space, for a proofer for outputting a proof image in which an image obtained through printing of an image based on the printing image data in accordance with a predetermined printing condition is reproduced, said color conversion method comprising:

a printing condition conversion step associated with a printing condition, of converting the coordinate value of the first color space into coordinate values of a colorimetry color space which is device-nondependent;

a spot color reference step of converting a spot color name into the coordinate values of the colorimetry color space;

a proof condition conversion step associated with a proof condition, of converting the coordinate values of the colorimetry color space into coordinate values of the second color space; and a composition step of synthesizing, on the colorimetry color space or the second color space, image data defined by coordinate values of the colorimetry color space or the second color space, wherein the process color image data is converted, with image data defined by coordinate values of the colorimetry color space or the second color space, wherein the spot color name is converted;

wherein the printing image data, which comprises the process color image data defined by the coordinate value of the first color space, and the spot color image data defined by the coordinate value of the characteristic direction, is converted into the image data defined by the coordinate value of the second color space, for the proofer.

According to the color conversion method of the present invention as mentioned above, in the printing condition conversion step, the print profile is used, in the spot color reference step, a chromaticity value such as L*a*b* value of the spot color, which will be offered from a maker of the spot color ink, is referred to, and in the proof condition conversion step, the proofer profile is used. Further, in the composition step, the process color image data and the spot color image data are combined. In this case, what is needed to be added or altered in accordance with addition or alteration of the proofer is only the proofer profile used in the proof condition conversion step. Thus, as compared with the technology disclosed in the above-mentioned Japanese Patent Application Laid Open Gazette Hei. 10-248017 in which there is a need to add or alter both the first conversion system and the second conversion system, which are of large scale, in accordance with addition or alteration of the proofer, according to the color conversion method of the present invention, it is possible to reduce an amount of addition of data resulting from addition of the proofer, and thus it is advantageous on a data management or on a memory capacity. Further, according to the color conversion method of the present invention, the conversion process for the spot color is set up independently of the conversion process for the process color. This feature makes it possible to obtain a proof image with great accuracy of color reproduction which is the same level as the technology disclosed in the above-mentioned Japanese Patent Application Laid Open Gazette Hei. 10-248017.

In the color conversion method of the present invention as mentioned above, it is acceptable that said composition step is a step of synthesizing different types of image data on the second color space, or alternatively that said composition step is a step of synthesizing different types of image data on the colorimetry color space.

In the event that said composition step is a step of synthesizing different types of image data on the second color space, it is possible to adopt a color conversion method wherein of the printing image data, the process color image data defined by the coordinate value of the first color space is converted into image data defined by the coordinate values of the colorimetry color space in said printing condition conversion step, and the image data defined by the coordinate values of the colorimetry color space thus obtained through the conversion is further converted into image data defined by the coordinate value of the second color space in said proof condition conversion step, the spot color name is converted into the coordinate values of the colorimetry color space in said spot color reference step, and the coordinate values of the colorimetry color space thus obtained through the conversion is converted into the coordinate value of the second color space in said proof condition conversion step, and in said composition step, the image data defined by the coordinate value of the second color space, for the proofer, is synthesized in accordance with the image data defined by the coordinate value of the second color space, after conversion by said proof condition conversion step, the coordinate value of the second color space corresponding to the spot color, after conversion by said proof condition conversion step, and the spot color image data of the printing image data.

In the event that said composition step is a step of synthesizing different types of image data on the colorimetry color space, it is possible to adopt a color conversion method wherein of the printing image data, the process color image data defined by the coordinate value of the first color space is converted into image data defined by the coordinate values of the colorimetry color space in said printing condition conversion step, the spot color name is converted into the coordinate values of the colorimetry color space in said spot color reference step, in said composition step, the image data defined by the coordinate values of the colorimetry color space, for the proofer, is synthesized in accordance with the image data defined by the coordinate values of the colorimetry color space, after the conversion by said printing condition conversion step, the coordinate values of the colorimetry color space corresponding to the spot color, after the conversion by said spot color reference step, and the spot color image data of the printing image data, and the image data defined by the coordinate values of the colorimetry color space, for the proofer, which is synthesized by said composition step, is converted by said proof condition conversion step into the image data defined by the coordinate value of the second color space, for the proofer.

Further, in the color conversion method of the present invention as mentioned above, in the event that said composition step is a step of synthesizing different types of image data on the second color space, it is preferable that prior to conversion of the printing image data into the image data for the proofer, there is produced a process color conversion step in which the coordinate value of the first color space is directly converted into the coordinate value of the second color space in accordance with said printing condition conversion step and said proof condition conversion step, in conversion of the process color image data of the printing image data, there is applied said process color conversion step instead of individual application of both said printing condition conversion step and said proof condition conversion step, so that of the printing image data, the process color image data defined by the coordinate value of the first color space is converted into image data defined by the coordinate value of the second color space before synthesized with the spot color image data.

In the event that prior to the actual color conversion, the above-mentioned process color conversion step is produced, it takes time at the preparation stage by the corresponding production of the process color conversion step. But in the actual color conversion, the process color image data is converted from the first color space to the second color space directly without passing through the colorimetry color space, and thus it is possible to contribute to enhancement of efficiency of the color conversion.

To achieve the above-mentioned object, the present invention provides a color conversion apparatus for converting printing image data, which comprises process color image data defined by a coordinate value of a predetermined first color space, and spot color image data defined by a coordinate value of a characteristic direction, into image data defined by a coordinate value of a predetermined second color space, for a proofer for outputting a proof image in which an image obtained through printing of an image based on the printing image data in accordance with a predetermined printing condition is reproduced, said color conversion apparatus comprising:

a definition storage section for storing a first coordinates conversion definition associated with a printing condition, defining an association between the coordinate value of the first color space and the coordinate values of a colorimetry color space which is device-nondependent, a spot color and coordinates conversion definition defining an association between a spot color name and the coordinate values of the colorimetry color space, a second coordinates conversion definition defining an association between the coordinate values of the colorimetry color space and the coordinate value of the second color space, and a coordinates composition definition defining an association among coordinate values of the colorimetry color space or the second color space, wherein the process color image data is converted, on the colorimetry color space or the second color space, coordinate values of the colorimetry color space or the second color space, wherein the spot color name is converted, and a set of coordinate values wherein said two types of coordinate values are synthesized, and a color conversion section for converting the printing image data, which comprises the process color image data defined by the coordinate values of the first color space and the spot color image data defined by the coordinate values of the characteristic direction, into the image data defined by the coordinate value of the second color space, for the proofer, referring to said first coordinates conversion definition, said spot color and coordinates conversion definition, said second coordinates conversion definition, and said coordinates composition definition, which are stored in said definition storage section.

According to the color conversion apparatus of the present invention as mentioned above, it is possible to suppress a degree of an increment of a memory capacity of the definition storage section, and also possible to perform a color conversion with great accuracy for outputting a proof image.

In the color conversion apparatus of the present invention as mentioned above, it is acceptable that said coordinates composition definition, which is stored in said definition storage section, defines an association between said two types of coordinate values of the second color space and said set of coordinate values, and said color conversion section comprises:

first conversion means for converting the process color image data defined by the coordinate value of the first color space, of the printing image data, into image data defined by the coordinate values of the colorimetry color space, referring to said first coordinates conversion definition;

second conversion means for converting the spot color name into the coordinate values of the colorimetry color space, referring to said spot color and coordinates conversion definition;

third conversion means for converting the image data defined by the coordinate values of the colorimetry color space, after conversion by said first conversion means, into image data defined by the coordinate value of the second color space, referring to said second coordinates conversion definition;

fourth conversion means for converting the coordinate values of the colorimetry color space, associated with the spot color, after conversion by said second conversion means, into the coordinate value of the second color space, referring to said second coordinates conversion definition;

first composition means for synthesizing the image data defined by the coordinate value of the second color space, for the proofer, in accordance with the image data defined by the coordinate value of the second color space, after conversion by said third conversion means, the coordinate value of the second color space corresponding to the spot color, after conversion by said fourth conversion means, and the spot color image data of the printing image data, referring to said coordinates composition definition.

In the color conversion apparatus of the present invention as mentioned above, alternatively, it is acceptable that said coordinates composition definition, which is stored in said definition storage section, defines an association between said two types of coordinate values of the colorimetry color space and said set of coordinate values, and said color conversion section comprises:

fifth conversion means for converting the process color image data defined by the coordinate value of the first color space, of the printing image data, into image data defined by the coordinate values of the colorimetry color space, referring to said first coordinates conversion definition;

sixth conversion means for converting the spot color name into the coordinate values of the colorimetry color space, referring to said spot color and coordinates conversion definition;

second composition means for synthesizing the image data defined by the coordinate values of the colorimetry color space, for the proofer, in accordance with the image data defined by the coordinate values of the colorimetry color space, after conversion by said fifth conversion means, the coordinate values of the colorimetry color space corresponding to the spot color, after conversion by said sixth conversion, and the spot color image data of the printing image data, referring to said coordinates composition definition; and seventh conversion means for converting the image data defined by the coordinate values of the colorimetry color space, for the proofer, which is synthesized by said second composition means, into the image data defined by the coordinate value of the second color space, for the proofer, referring to said second coordinates conversion definition.

In the color conversion apparatus of the present invention as mentioned above, further alternatively it is acceptable that said coordinates composition definition, which is stored in said definition storage section, defines an association between said two types of coordinate values of the colorimetry color space and said set of coordinate values, and said color conversion section comprises:

coordinates conversion definition construction means for constructing a third coordinates conversion definition to directly associate the coordinate value of the first color space with the coordinate value of the second color space in accordance with said first coordinates conversion definition and said second coordinates conversion definition;

eighth conversion means for converting the process color image data defined by the coordinate value of the first color space, of the printing image data, into image data defined by the coordinate values of the second color space, referring to said third coordinates conversion definition;

ninth conversion means for converting the spot color name into the coordinate values of the colorimetry color space, referring to said spot color and coordinates conversion definition;

tenth conversion means for converting the coordinate values of the colorimetry color space corresponding to the spot color, after conversion by said ninth conversion means, into the coordinate value of the second color space, referring to said second coordinates conversion definition; and third composition means for synthesizing the image data defined by the coordinate values of the second color space, for the proofer, in accordance with the image data defined by the coordinate values of the second color space, after conversion by said eighth conversion means, the coordinate values of the second color space corresponding to the spot color, after conversion by said ninth conversion, and the spot color image data of the printing image data, referring to said coordinates composition definition.

To achieve the above-mentioned object, the present invention provides a color conversion definition storage medium storing a color conversion definition for converting printing image data, which comprises process color image data defined by a coordinate value of a predetermined first color space, and spot color image data defined by a coordinate value of a characteristic direction, into image data defined by a coordinate value of a predetermined second color space, for a proofer for outputting a proof image in which an image obtained through printing of an image based on the printing image data in accordance with a predetermined printing condition is reproduced, said color conversion definition comprising:

a first coordinates conversion definition associated with a printing condition, defining an association between the coordinate value of the first color space and the coordinate values of a colorimetry color space which is device-nondependent;

a spot color and coordinates conversion definition defining an association between a spot color name and the coordinate values of the colorimetry color space;

a second coordinates conversion definition defining an association between the coordinate values of the colorimetry color space and the coordinate value of the second color space, said second coordinates conversion definition being associated with a proof condition; and a coordinates composition definition defining an association among coordinate values of the colorimetry color space or the second color space, wherein the process color image data is converted, on the colorimetry color space or the second color space, coordinate values of the colorimetry color space or the second color space, wherein the spot color name is converted, and a set of coordinate values wherein said two types of coordinate values are synthesized.

The color conversion definition stored in the color conversion definition storage medium of the present invention is suitable for an increment of a proofer and the like, and adoption of such a color conversion definition to perform a color conversion makes it possible to perform a color conversion with great accuracy in color reproduction of a spot color.

Incidentally, it is acceptable that the various types of "definition" as mentioned above is data of a table structure, for example, LUT, or another structure; a program for executing an arithmetic operation based on a conversion formula; or alternatively a combination of data and a program, such as a combination of data of LUT structure and a program for executing interpolation arithmetic operations.

BRIEF DESCRIPTION OF THE DRAWINGS

FIG. 15 is a functional block diagram of a color conversion section of the third embodiment of a color conversion apparatus according to the present invention.

DETAILED DESCRIPTION OF PREFERRED EMBODIMENTS

Embodiments of the present invention will be described with reference to the accompanying drawings.

Figure 1:
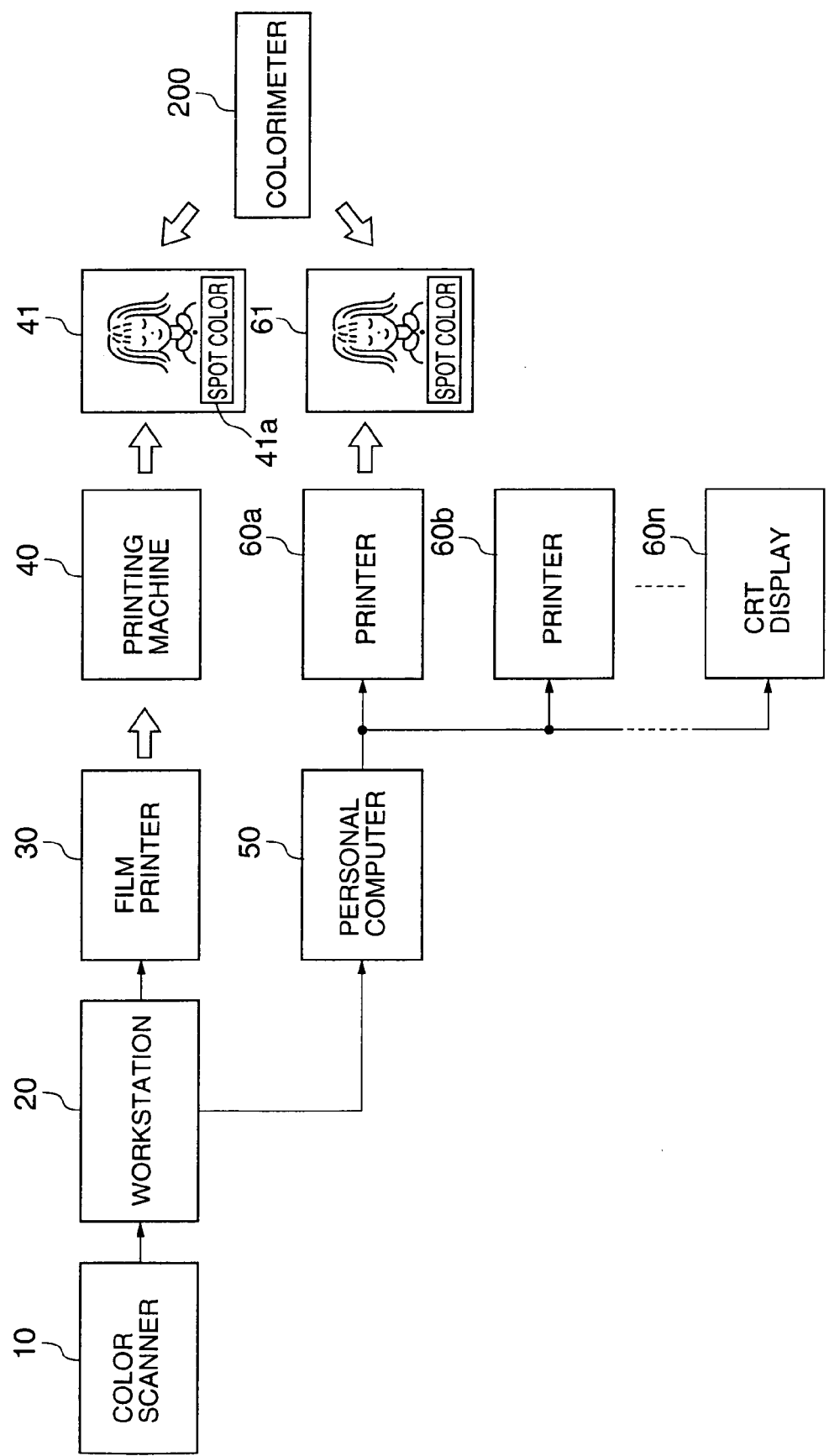
FIG. 1 is a construction view of a system for producing print and proof image, to which an embodiment of the present invention is applied.

FIG. 1 is a construction view of a system for producing print and proof image, to which an embodiment of the present invention is applied.

A color scanner 10 reads an original image and generates color separation image data for four colors of CMYK representative of the original image. The image data for four colors of CMYK is fed to a workstation 20. In the workstation 20, an electronic page make-up is performed in accordance with entered image data by an operator and image data representative of an image for printing is generated. Here, an operator, who operates the workstation 20, determines that printing using some spot color ink as well as process color ink of four colors of CMYK is performed, and in the electronic page make-up an image including the spot color is designed. Accordingly, here, as printing image data representative of the image for printing, there are generated process color image data defined in form of coordinate values (combination of dot % of C, M, Y, K) for the color space (an example of the first color space referred to in the present invention) of four colors of CMYK and spot color image data defined in form of coordinate values (dot o/o of the spot color) of the characteristic direction, for spot color to be adopted. The printing image data, which comprises the process color image data and the spot color image data, is fed to a film printer 30 in the event that a printing is to be performed. The film printer 30 produces a printing film original plate, which comprises each plate for CMYK and a plate for spot color, in accordance with the entered printing image data.

A printing plate is produced from the printing film original plate, and the produced printing plate is loaded onto a printing machine 40. Ink is applied to the printing plate loaded onto the printing machine. The applied ink is transferred to a printing paper to form an image 41 on the printing paper. The ink used at that time is process color ink for four colors of CMYK and a predetermined spot color ink. On the image 41, there exists an image portion 41a printed with the spot color ink. Incidentally, the spot color ink to be used for once printing is not restricted to one sort of spot color ink. However, for the convenience of explanation, there will be explained the embodiment assuming that the spot color ink to be used is only one sort of spot color ink.

Such a series of work that the film printer 30 is used to produce a film original plate, a printing plate is produced and loaded onto the printing machine 40, and ink is applied to the printing plate to perform a printing on a paper is large-scale work and costs a lot. For this reason, prior to perform an actual printing work, a proof image 61 is produced by a proofer in a manner as set forth below so that a finish of the printed image 41 is confirmed beforehand.

To produce a proof image, printing image data, which is produced by an electronic page make-up on the workstation 20, is fed to a personal computer 50. Here, the image data fed to the personal computer 50 is a description language data described with a so-called PDL (Page Description Language). The personal computer 50 converts the description language data into process image data for four colors of CMYK and spot color image data associated with a spot color, which are developed into a bit map by a so-called RIP (Raster Image Processor). Combined image data of the process image data for four colors of CMYK and the spot color image data for a spot color is substantially the same as the printing image data to be fed to the film printer 30.

The process color image data for and the spot color image data are converted into image data for three colors of RGB suitable for a proofer (here a printer 60a), which intends to output a proof image, of a plurality of proofers comprising a plurality of printers 60a, 60b, and a CRT display 60n, through referring to a color conversion definition inside the personal computer 50. The printer 60a receives the image data for three colors of RGB and produces the proof image 61 in accordance with the entered image data for three colors of RGB.

A degree of coincidence of colors of the image 41 obtained through printing by the printing machine 40 and the proof image obtained by the printer 60*a* is determined by a color conversion definition in the personal computer 50. The color conversion definition is produced for each proofer (for each proof condition).

While FIG. 1 shows only one printing machine, it is acceptable that a plurality of printing machines exist. Or alternatively, it is acceptable that while only one printing machine is provided, a plurality of printing conditions, which are mutually different, exist. The color conversion definition is produced in accordance with each of the plurality of printing conditions including the difference of the printing machines. More in details, the color conversion definition is produced in accordance with a combination of each printing condition and each proofer (each proof condition in the event that only one proofer is provided and a plurality of proof condition exist). The color conversion definition will be described later. Also a calorimeter will be described later.

In this manner, a proof image is produced and the proof image is confirmed. Thus, it is possible to confirm a finish of printing beforehand.

An aspect of the embodiment of the present invention in the proof image producing system resides in processing contents to be executed inside the personal computer 50. Hereinafter, there will be described the personal computer 50.

Figure 2:
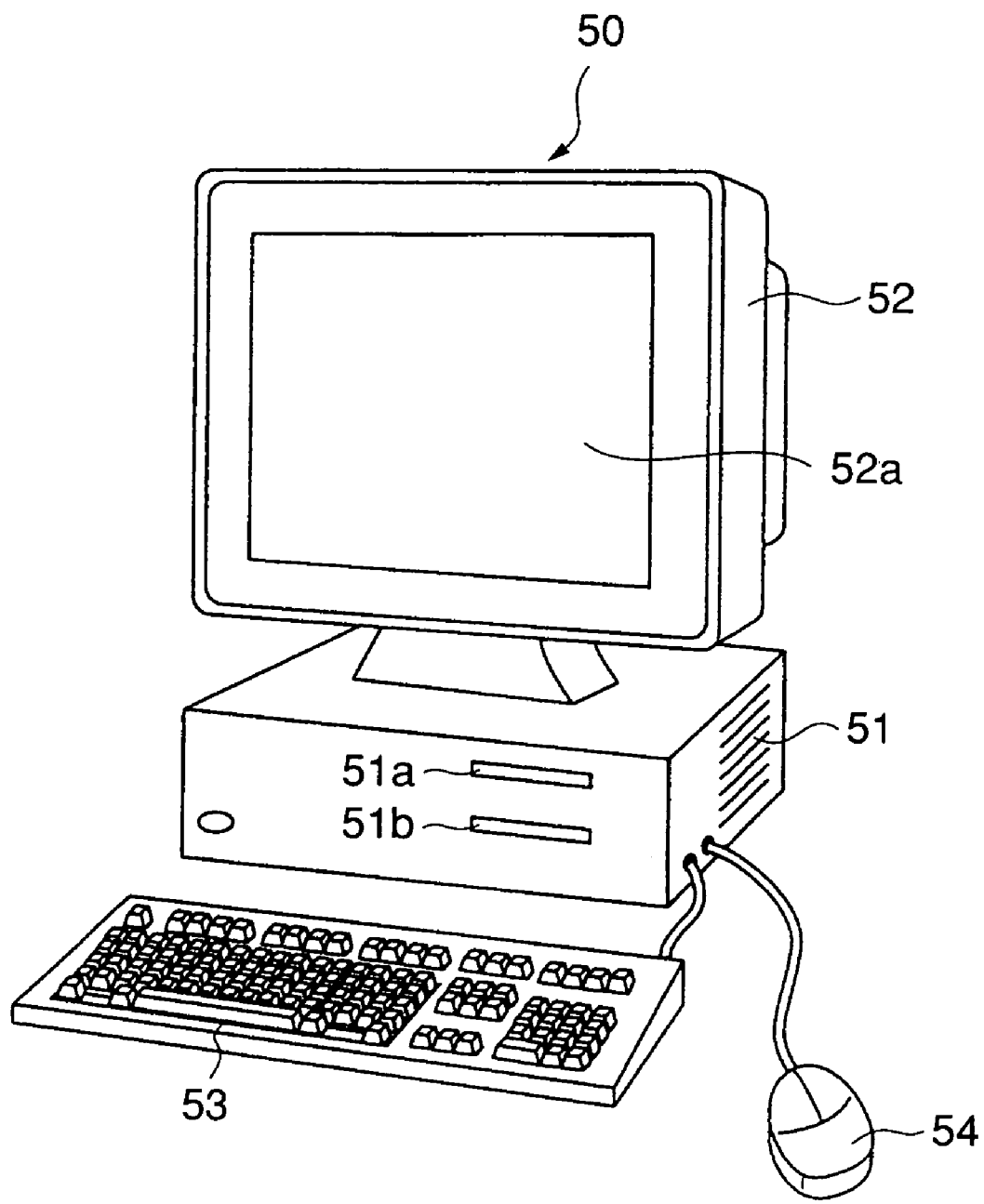
FIG. 2 is a perspective view of the personal computer shown in FIG. 1.
Figure 3:
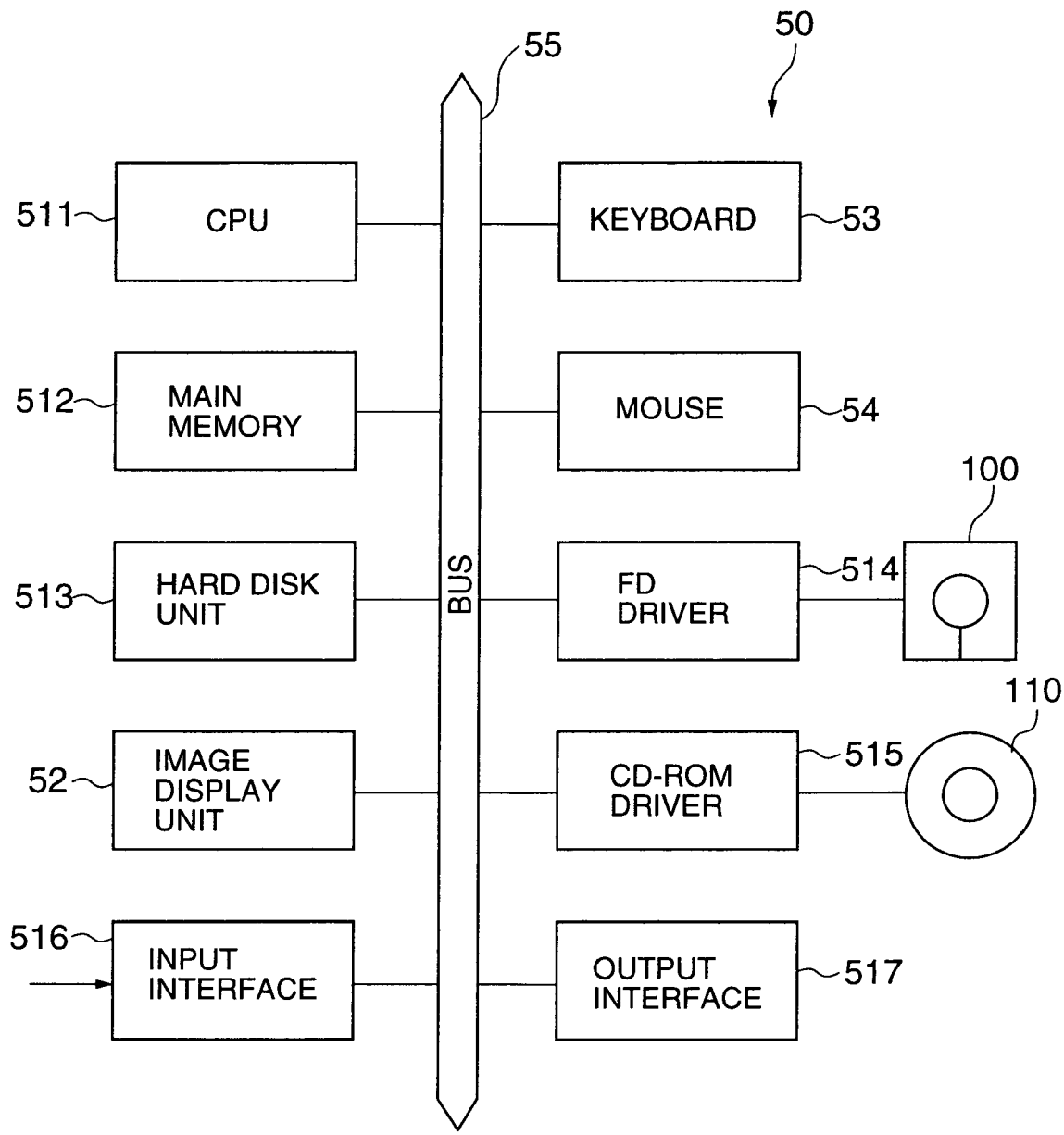
FIG. 3 is a hardware construction view of the personal computer.

FIG. 2 is a perspective view of the personal computer 50 shown in FIG. 1. FIG. 3 is a hardware construction view of the personal computer 50.

The personal computer 50 comprises a main frame 51, an image display unit 52 for displaying an image on a display screen 52*a* in accordance with an instruction from the main frame 51, a keyboard 53 for entering information according to a key operation to the main frame 51, and a mouse 54 for entering an instruction according to, for example, an icon displayed on an arbitrarily position on the display screen 52*a* through designation. The main frame 51 is provided with a floppy disk loading slot 51*a* for loading a floppy disk, and a CD-ROM loading slot 51*b* for loading a CD-ROM.

The main frame 51 incorporates therein, as shown in FIG. 3, a CPU 511 for executing various sorts of program, a main memory 512 wherein a program stored in a hard disk unit 513 is read out and developed for the purpose of execution by the CPU 511, the hard disk unit 513 storing various sorts of programs and data, an FD driver 514 for accessing a floppy disk 100 loaded onto the FD driver 514, a CD-ROM driver 515 for accessing a CD-ROM 110 loaded onto the CD-ROM driver 515, an input interface 516 connected with the workstation 20 (cf. FIG. 1) for receiving image data from the workstation 20, and an output interface 517 for transmitting image data to the printers 60*a*, 60*b*, ..., and the CRT display 60*n* which are used as the proofers. Those elements are mutually connected with the image display unit 52, the keyboard 53 and the mouse 54 via a bus 55. It is acceptable that the image display unit 52 shown in FIGS. 2 and 3 is used as one of the proofers.

The CD-ROM 110 stores therein a color conversion program for causing the personal computer 50 to operate as a color conversion apparatus. Such CD-ROM 110 is loaded on the CD-ROM driver 515, so that the color conversion program stored in the CD-ROM 110 is up-loaded onto the personal computer 50 and is stored in the hard disk unit 513.

Next, there will be described a method of producing a color conversion definition constructed in the personal computer 50.

Figure 4:
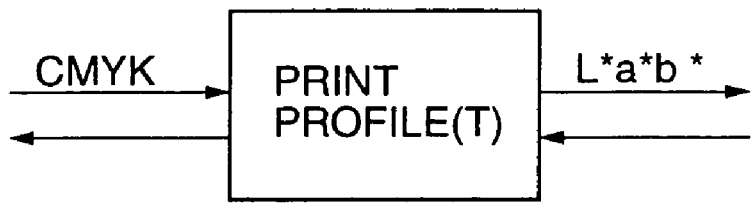
FIG. 4 is a conceptual view of a print profile constituting part of the color conversion definition.

FIG. 4 is a conceptual view of a print profile constituting part of the color conversion definition.

As mentioned above, in many cases, a print profile associated with a typical printing condition is provided from a printer (a printing service trader), and thus as far as a print profile associated with a desired print condition is available, there is no need to produce a print profile. Here, however, there will be explained a basic method of producing a print profile in the event that the print profile is newly produced.

Dot % data for four colors of CMYK to be generated from the workstation shown in FIG. 1 is sequentially altered, for example, such as 0%, 10%, ..., 100%, so that color patch images based on the dot % data thus generated are produced in accordance with the above-mentioned printing procedure. A calorimeter 200 is used to measure color patches constituting a color patch image wherein while the image 41 shown in FIG. 1 is not an image representative of a color patch image, it is assumed that a color patch image is printed instead of the image 41. This makes it possible to constitute a print profile representative of the association between coordinate values on a color space (a first color space referred to in the present invention) for four colors of CMYK and coordinate values on a colorimetry color space (here L*a*b* color space). This print profile corresponds to an example of a first coordinates conversion definition referred to in the present invention.

Here, in production of the color patch for producing the print profile, only process color ink for four colors of CMYK is used and spot color ink is not used. The reason why this is to do so is that addition of the spot color ink causes the produced print profile to be lost in generality or universality, and it is very troublesome that various sorts of spot color ink are prepared and a print profile is established for each combination of spot color ink.

Figure 5:
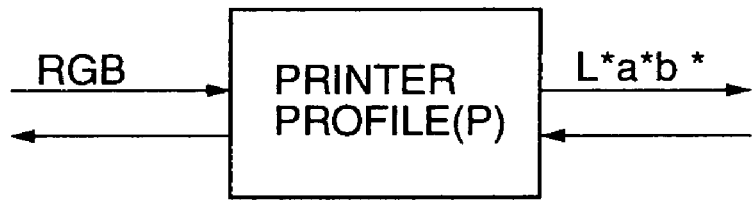
FIG. 5 is a conceptual view of a print profile constituting part of the color conversion definition.

FIG. 5 is a conceptual view of a print profile constituting part of the color conversion definition.

As mentioned above, also with respect to the printer profile, in many cases, it is provided from a printer maker. Thus, as far as a printer profile associated with a desired printer (here the printer 60*a* shown in FIG. 1) is available, there is no need to produce the printer profile. Nevertheless, there will be explained a basic method of producing a printer profile in the event that the printer profile is newly produced. The method of producing a printer profile is similar to the above-mentioned method of producing a print profile.

Here, the personal computer 50 shown in FIG. 1 is used to sequentially vary image data for three colors of RGB on each color in a predetermined numbers of step (e.g. 8 steps) from the minimum value (e.g. 0) to the maximum value (e.g. 255), so that a color patch image is produced in accordance with the image data thus sequentially generated. A calorimeter 200 is used to measure color patches constituting a color patch image wherein while the image 61 shown in FIG. 1 is not an image representative of a color patch image, it is assumed that a color patch image is outputted instead of the image 61. This makes it possible to constitute a printer profile representative of the association between coordinate values on a color space (a second color space referred to in the present invention) for three colors of RGB and coordinate values on a colorimetry color space (here L*a*b* color space), on the printer 60*a*.

This printer profile is used for converting coordinate values on the L*a*b* color space to coordinate values on the color space for three colors of RGB, and corresponds to an example of a second coordinates conversion definition referred to in the present invention.

Figure 6:
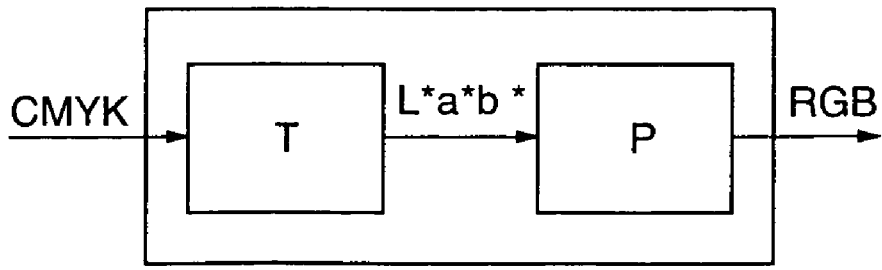
FIG. 6 is a conceptual view of the color conversion definition for directly converting coordinate values of CMYK color spaces to coordinate values of RGB color spaces, which is produced through a combination of a print profile and a printer profile.

FIG. 6 is a conceptual view of the color conversion definition for directly converting coordinate values of a CMYK color space to coordinate values of an RGB color space, which is produced through a combination of a print profile and a printer profile.

Here, there is constructed a third color conversion definition in which the print profile (a first color conversion definition) is combined with the printer profile (a second color conversion definition), so that coordinate values of a CMYK color space are converted into coordinate values of an RGB color space directly without passing through an L*a*b* color space.

The third color conversion definition is used in some embodiment of a various types of embodiments of the present invention which are described later.

Figure 7:
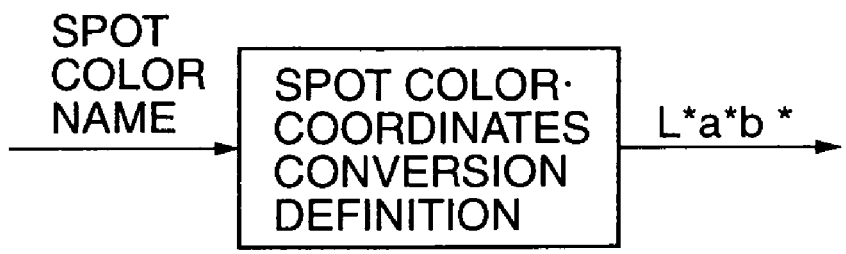
FIG. 7 is a typical illustration of spot color and coordinates conversion definition constituting part of the color conversion definition.

FIG. 7 is a typical illustration of spot color and coordinates conversion definition constituting part of the color conversion definition.

The spot color and coordinates conversion definition is to associate a spot color name and coordinate values on L*a*b* color space of the spot color ink. With respect to the coordinate values on L*a*b* color space of the spot color ink, generally, information is available from a maker of the spot color ink. Nevertheless, in the event that it is intended to determine the coordinate values on L*a*b* color space of the spot color ink, data, wherein dot % of monochrome of the spot color ink is 100%, is generated, a patch of the solid of the spot color is produced based on the data in accordance with the above-mentioned printing procedure, and the patch of the solid is measured by the calorimeter thereby determining the coordinate values on L*a*b* color space.

That is, the spot color and coordinates conversion definition shown in FIG. 6 determines coordinate values of on L*a*b* color space of the solid patch wherein dot % of the spot color represented by the spot color name is 100%.

Figure 8:
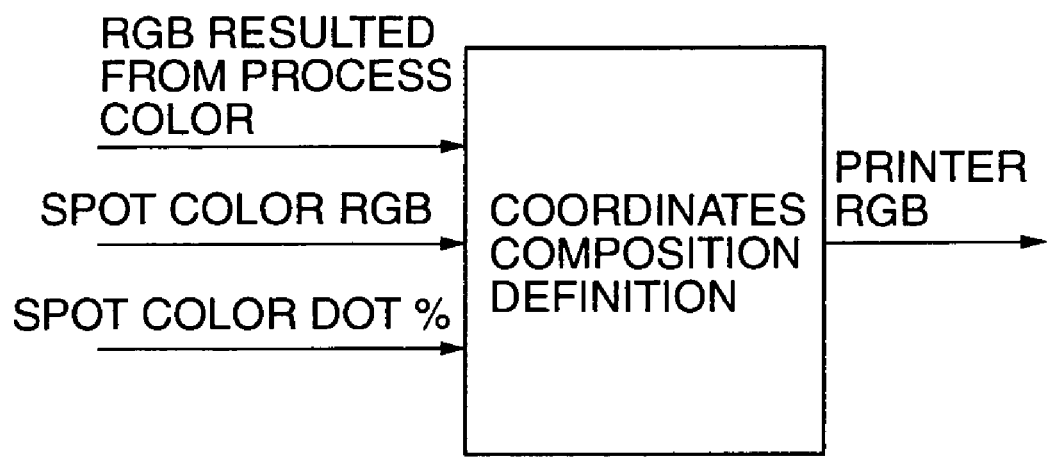
FIG. 8 is a typical illustration of coordinates composition definition constituting part of the color conversion definition.

FIG. 8 is a typical illustration of coordinates composition definition constituting part of the color conversion definition.

By way of the coordinates composition definition, there is raised a coordinates composition definition in which coordinate values on RGB color space (an example of the second color space referred to in the present invention) are synthesized.

The coordinates composition definition receives image data defined by coordinate value of RGB color space, resulted from process color image data for four colors of CMYK of printing image data, coordinate values on RGB color space for spot color, resulted from coordinate values of L*a*b* color space of the solid of the spot color obtained through referring to the spot color and coordinates conversion definition shown in FIG. 7, and dot % data (spot color image data) of the spot color, which constitutes the printing image data. In the coordinates composition definition, by way of example, the respective data for R, G, B defined by coordinate values on RGB color space, which are determined by coordinate values (associated with dot %:100%) on RGB color space, as to the spot color, and dot % represented by spot color image data, and the respective data for R, G, B resulted from the process color image data of the printing image data, are added to one another. The coordinates composition definition generates image data for R, G, B so as to output a proof image from a proofer (here the printer 60a shown in FIG. 1) for a proof image output through, for example, the above-mentioned arithmetic operation or an LUT corresponding to such an arithmetic operation.

While there is explained the coordinates composition definition wherein coordinates are synthesized on RGB color space, the coordinates composition definition is not restricted to one wherein coordinates are synthesized on RGB color space. It is acceptable that the coordinates composition definition is one wherein coordinates are synthesized on L*a*b* color space. This is simply different in color space representative of coordinates. Thus, there will be omitted in figure and explanation for the coordinates composition definition taking L*a*b* color space other than RGB color space.

Figure 9:
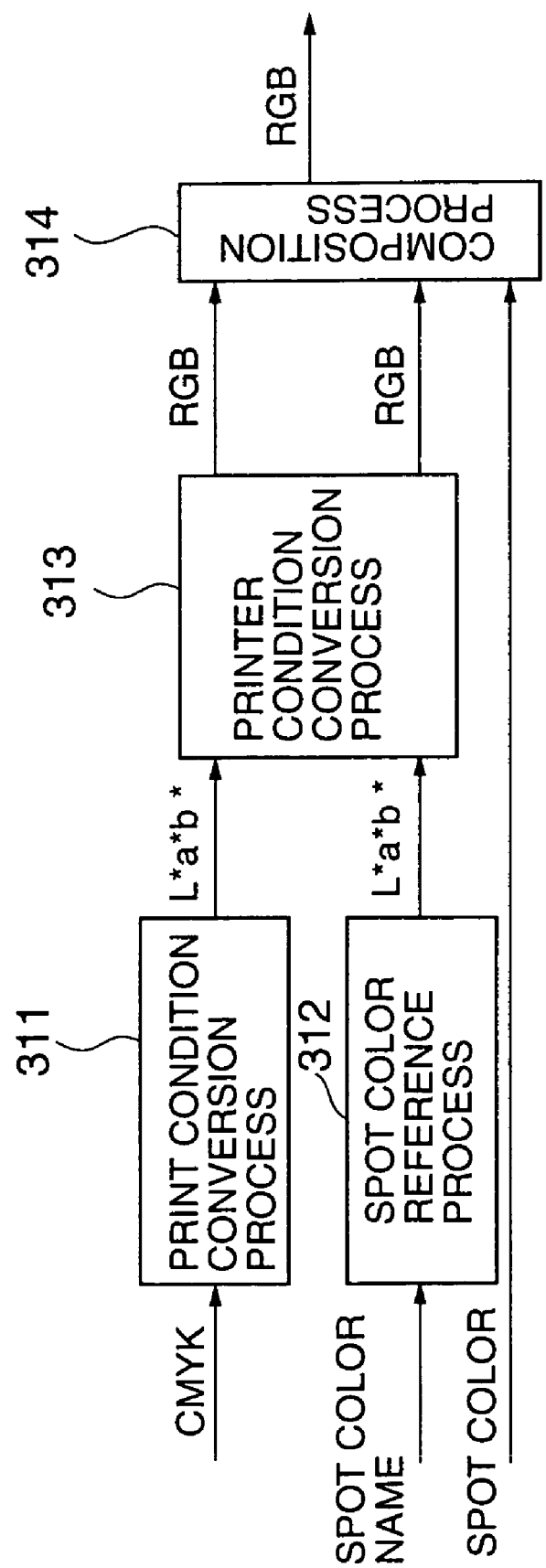
FIG. 9 is a view showing a first embodiment of a color conversion method according to the present invention.

FIG. 9 is a view showing a first embodiment of a color conversion method according to the present invention.

FIG. 9 shows a print condition conversion process 311, a spot color reference process 312, a printer condition conversion process 313 (an example of the proof condition conversion process referred to in the present invention) and a composition process 314.

In the print condition conversion process 311, the print profile (the first color conversion definition), which is explained in conjunction with FIG. 4, is referred to so that process color image data defined by coordinate values on CMYK, color space of the printing image data is converted into image data defined by coordinate values on L*a*b* color space.

In the spot color reference process 312, the spot color and coordinates conversion definition explained in conjunction with FIG. 7 is referred to so that the spot color name is converted into coordinate values on L*a*b* color space as to the spot color.

In the printer condition conversion process 313, the printer profile (the second color conversion definition), which is explained in conjunction with FIG. 5, is referred to so that image data defined by coordinate values on L*a*b* color space, which is obtained in the print condition conversion process 311, is converted into image data defined by coordinate values on RGB color space, and further coordinate values on L*a*b* color space, which is obtained in the spot color reference process 312, is converted into coordinate values on RGB color space.

Further, in the composition process 314, the image data defined by coordinate values on RGB color space, which is obtained in the printer condition conversion process 313, the coordinate values on RGB color space with respect to the spot color, which is also obtained in the printer condition conversion process 313, and the dot % data of the spot color are synthesized into image data for proof image output, which is defined by the coordinate values on RGB color space, in accordance with the coordinates composition definition explained referring to FIG. 8.

The image data on RGB color space obtained in the composition process 314 is transmitted to the printer 60a for proof image output, shown in FIG. 1, so as to print-out a proof image in accordance with the transmitted image data.

According to the color conversion method shown in FIG. 9, it is possible to obtain a proof image excellent in color reproduction with respect to spot color too, since the process color for CMYK and the spot color are subjected to data conversion through the respective different path and then synthesized. Further, according to the color conversion method shown in FIG. 9, what is needed to be altered when a printer for outputting a proof image is altered is only a printer profile referred to in the printer condition conversion process. This makes it possible to reduce a load of the data management as compared with the method disclosed in the above-mentioned Japanese Patent Application Laid Open Gazette Hei. 10-248017.

Figure 10:
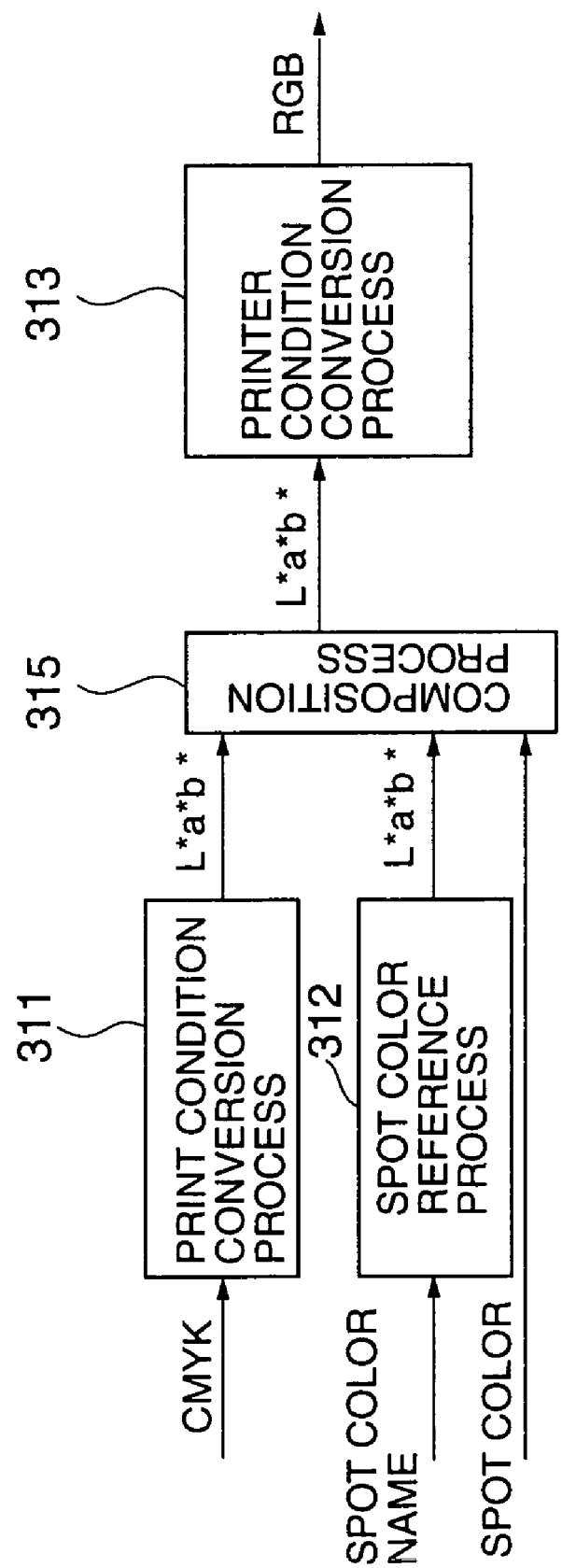
FIG. 10 is a view showing a second embodiment of a color conversion method according to the present invention.

FIG. 10 is a view showing a second embodiment of a color conversion method according to the present invention.

According to the second embodiment of a color conversion method shown in FIG. 10, there is provided a composition process 315 for performing composition of data on L*a*b* color space. In the composition process 315, the image data defined by coordinate values on L*a*b* color space, which is obtained in the print condition conversion process 311, the coordinate values on L*a*b* color space with respect to the spot color, which is obtained in the spot color reference process 312, and the dot % data of the spot color are synthesized into image data for printer, which is defined by the coordinate values on L*a*b* color space, in accordance with the coordinates composition definition explained referring to FIG. 8 (for performing an arithmetic operation on L*a*b*. The image data defined by the coordinate values on L*a*b* color space, which is obtained in the composition process, is converted into image data for a printer, which is defined by coordinate values on RGB color space, referring to the printer profile (the second color conversion definition) shown in FIG. 5 in the printer condition conversion process 313. The image data on RGB color space, which is obtained through conversion in the printer condition conversion process 313, is transmitted to the printer 60a for proof image output shown in FIG. 1, in a similar fashion to that of the first embodiment of the present invention shown in FIG. 9. In the printer 60a, a proof image is printed out in accordance with the transmitted image data.

Also in the color conversion method shown in FIG. 10, in a similar fashion to that shown in FIG. 9, the process color for CMYK and spot color are individually converted into coordinate values on L*a*b* color spaces and then synthesized. Thus, it is possible to obtain a proof image excellent in color reproduction with respect to spot color too. Further, according to the color conversion method shown in FIG. 10, what is needed to be altered when a printer for outputting a proof image is altered is only a printer profile referred to in the printer condition conversion process 313. This makes it possible to reduce a load of the data management.

Figure 11:
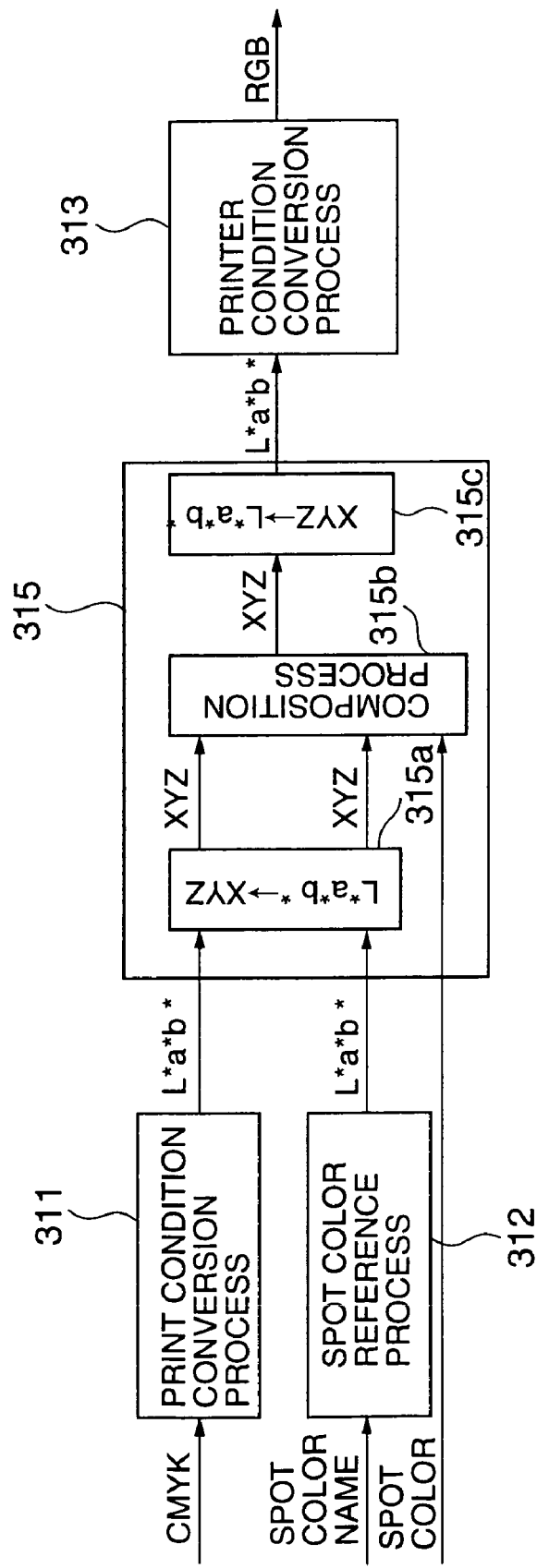
FIG. 11 is a view showing a modification of the second embodiment of a color conversion method according to the present invention.

FIG. 11 is a view showing a modification of the second embodiment of a color conversion method according to the present invention.

In the composition process 315, synthesis of coordinate values on L*a*b* color space is performed. More in details, in an L*a*b*·XYZ conversion process 315a, coordinate values on L*a*b* color space are converted into coordinate values on XYZ color space. In a composition process 315b, synthesis on XYZ color space is performed. In an XYZ L*a*b* conversion process 315c, coordinate values on XYZ color space after the synthesis are converted into coordinate values on L*a*b* color space.

The XYZ color space is associated with luminosity more directly than the L*a*b* color space, and thus it is possible to perform synthesis which involves few errors.

Figure 12:
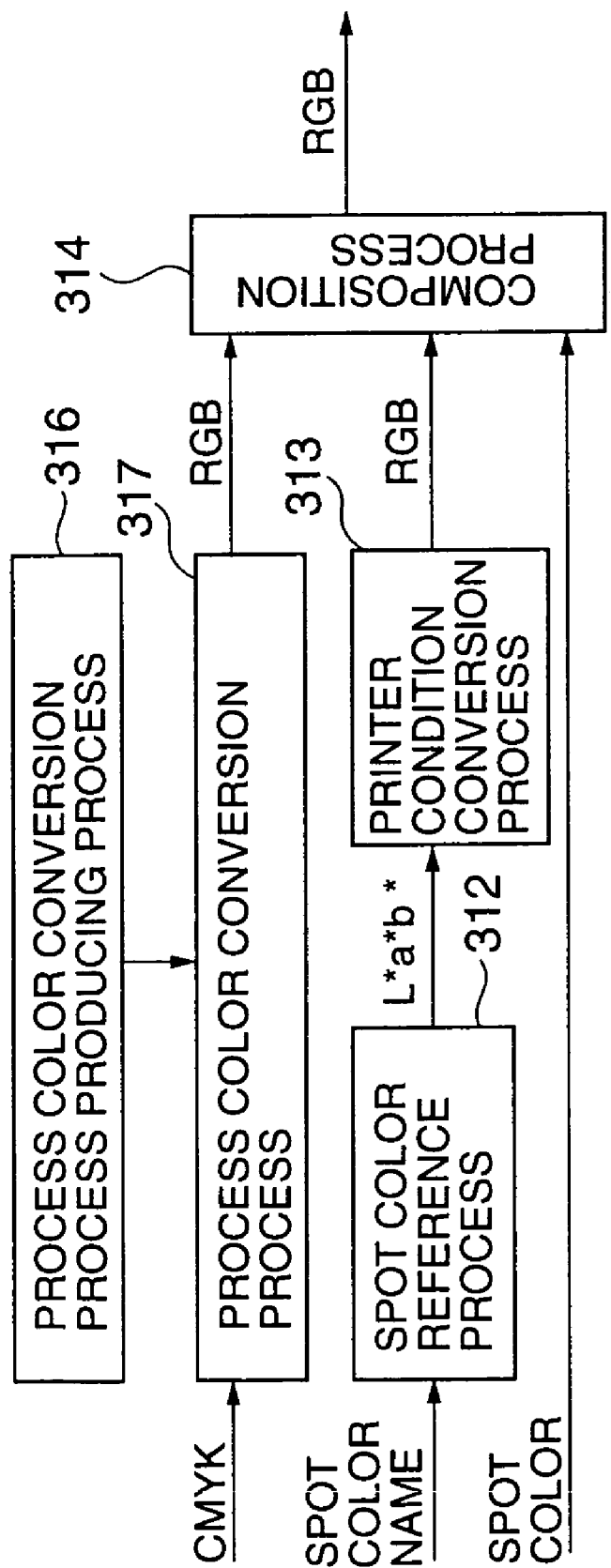
FIG. 12 is a view showing a third embodiment of a color conversion method according to the present invention.

FIG. 12 is a view showing a third embodiment of a color conversion method according to the present invention. There will be described different points from the first embodiment shown in FIG. 9.

In a process conversion process producing process 316, prior to conversion of image data for printing into image data for printer, the print profile (the first color conversion definition) explained referring to FIG. 4 and the printer profile (the second color conversion definition) explained referring to FIG. 5 are synthesized into a single color conversion definition (the third color conversion definition), as shown in FIG. 6.

After those preparation, the printing image data is converted into the image data for printer. In this case, with respect to the process color image data for four colors of CMYK of the printing image data, in process color conversion process 317 instead of both the processes of the print condition conversion process 311 and the printer condition conversion process 313, which are shown in FIG. 9, the process color image data for four colors of CMYK is directly converted into the image data for three colors of RGB.

With respect to the conversion process and the composition process related to the spot color, they are the same as those of the first embodiment shown in FIG. 9, and thus the redundant explanation will be omitted.

In case of the color conversion method shown in FIG. 12, as compared with the color conversion method according to the first embodiment shown in FIG. 9, there is a need to produce the third color conversion definition shown in FIG. 6 at the preparation step. However, according to the color conversion method shown in FIG. 12, in the actual color conversion, it is possible to reduce the process of the coordinates conversion by one and thereby contributing to a higher speed for color conversion.

Figure 13:
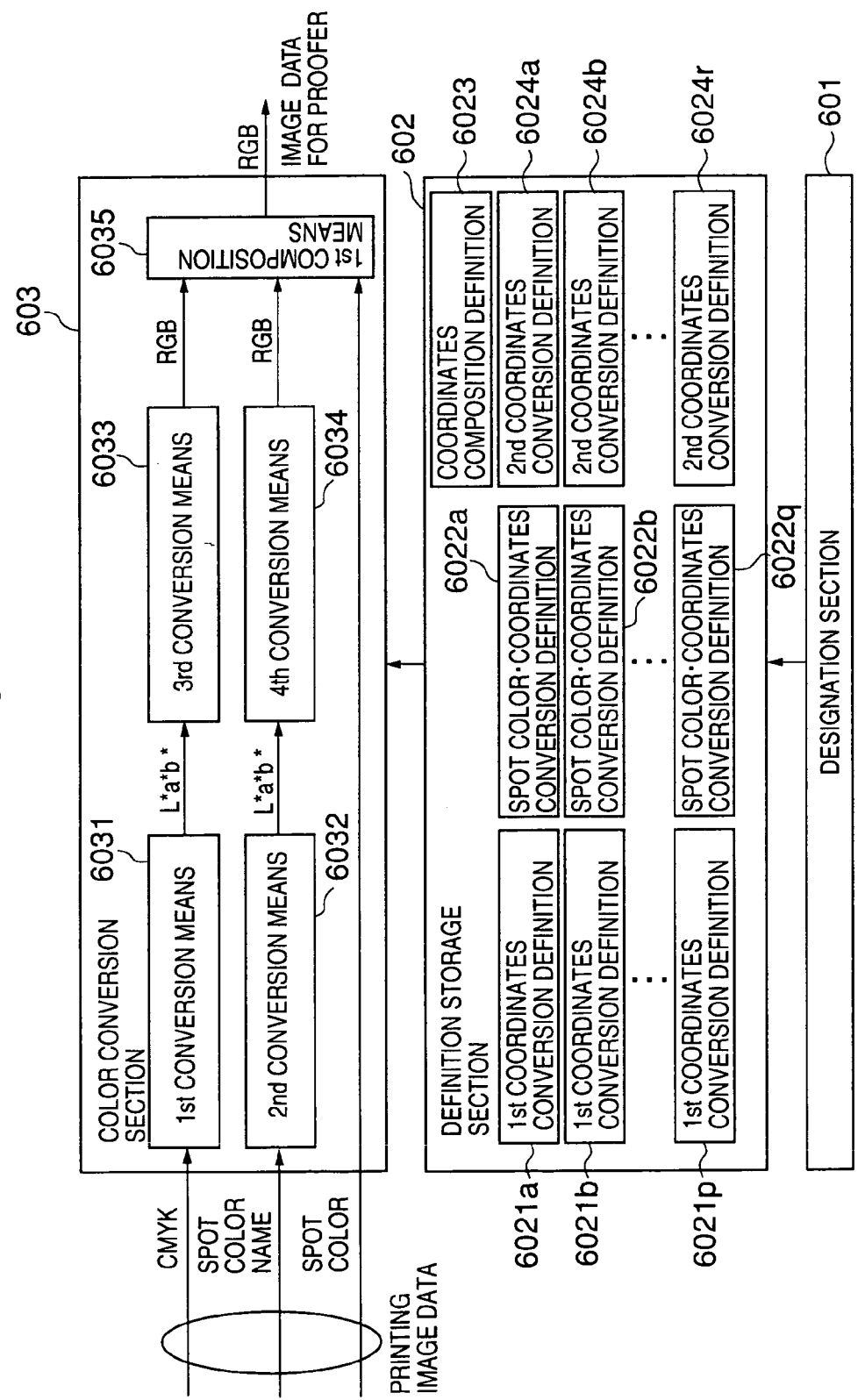
FIG. 13 is a functional block diagram of the first embodiment of a color conversion apparatus according to the present invention.

FIG. 13 is a functional block diagram of the first embodiment of a color conversion apparatus according to the present invention.

The color conversion apparatus is implemented by combination of the personal computer 50 shown in FIGS. 2 and 3 and a program which is executed by the personal computer 50.

The color conversion apparatus shown in FIG. 13 comprises a designation section 601, a definition storage section 602 and a color conversion section 603.

The definition storage section 602 stores therein a plurality of first coordinates conversion definitions (print profiles) (cf. FIG. 4 and the associated description) 6021a, 6021b, . . . , 6021p associated with print conditions, a plurality of spot color and coordinates conversion definitions 6022a, 6022b, . . . , 6022q (cf. FIG. 7 and the associated description) associated with various spot colors, coordinate composition definition 6023 (cf. FIG. 8 and the associated description), and a plurality of second coordinates conversion definitions (printer profiles) (cf. FIG. 5 and the associated description) 6024a, 6024b, . . . , 6024r associated with proof conditions. With respect to the second coordinates conversion definitions, in FIG. 5, they are referred to as the printer profile since it has been explained on the assumption that the proof image is printed out by the printer 60a shown in FIG. 1. However it is noted that the second coordinates conversion definitions includes the coordinates conversion definition associated with CRT display 60n shown in FIG. 1.

The definition storage section 602 is disposed inside the hard disk unit 513 shown in FIG. 3. And the definition storage section 602 (the hard disk unit 513 shown in FIG. 3) also corresponds to one embodiment of a color conversion definition storage medium of the present invention.

The designation section 601 performs designation of print conditions, designation of proof conditions (designation of a proofer which outputs a proof image), and designation of spot color used in printing. The keyboard 53 or the mouse 54 shown in FIGS. 2 and 3 may serve as the designation section 601. Incidentally, it is acceptable that designations of the print conditions and spot colors are not performed through the designation section 601, but the associated information is derived from the workstation 20 shown in FIG. 1.

When print condition is designated through the designation section 601, of the plurality of first coordinates conversion definitions 6021a, 6021b, . . . , 6021p which are stored in the definition storage section 602, a first coordinates conversion definition-(here the first coordinates conversion definition 6021*a*) associated with the designated print condition is read out and fed to the color conversion section 603. Similarly, when spot color is designated through the designation section 601, of the plurality of spot color and coordinates conversion definitions 6022*a*, 6022*b*, . . . , 6022*q* which are stored in the definition storage section 602, a spot color and coordinates conversion definition (here the spot color and coordinates conversion definition 6022*a*) associated with the designated spot color is read out and fed to the color conversion section 603. Further, when a printer for outputting a proof image or a CRT display unit is designated through the designation section 601, of the plurality of second coordinates conversion definitions 6024*a*, 6024*b*, . . . , 6024*r* which are stored in the definition storage section 602, a second coordinates conversion definition (here the second coordinates conversion definition 6024*a*) associated with the designated proofer (here the printer 60*a*) is read out and fed to the color conversion section 603.

Further, the coordinate composition definition 6023 is also read out from the definition storage section 602 and is fed to the color conversion section 603.

In this manner, a single color conversion definition, which comprises the first coordinates conversion definition 6021*a*, the spot color and coordinates conversion definition 6022*a*, the coordinate composition definition 6023, and the second coordinates conversion definition 6024*a*, is fed to the color conversion section 603, and thereafter, image data of PLD type for print image, which is produced by the electronic page make-up, is fed from the workstation 20 shown in FIG. 1 to the personal computer 50 (cf. FIGS. 1 to 3) with which the color conversion apparatus shown in FIG. 13 is implemented, so that the image data of PLD type is converted by RIP into a bit map type of image data, and process color image data defined by CMYK color space for print, of the bit map, and spot color image data representative of dot % of spot color of the bit map are fed to the color conversion section 603. Further fed to the color conversion section 603 is data representative of a spot color name designating a spot color.

In the color conversion section 603, color conversion based on the color conversion definition, which is inputted to the color conversion section 603 beforehand, is performed in accordance with the entered process color image data for four colors of CMYK, spot color image data and spot color name, so that image data for RGB is generated to derive a proof image using the printer 60*a* (cf. FIG. 1). The image data for RGB generated through the color conversion in the color conversion section 603 is transmitted to the printer 60*a* so as to output a proof image of color coincident to color of the printing matter including a printed portion by the spot color.

Hereinafter, there will explained color conversion means in the color conversion section 603.

The color conversion section 603 comprises first conversion means 6031, second conversion means 6032, third conversion means 6033, fourth conversion means 6034 and first composition means 6035.

Of the printing image data, the process color image data for four colors of CMYK is fed to the first conversion means 6031. In the first conversion means 6031, the first coordinates conversion definition (print profile) 6021*a*, which is read from the definition storage section 602 and fed to the color conversion section 603, is referred to so that the entered process color image data for four colors of CMYK is converted into image data defined by coordinate values of L*a*b* color space.

The image data defined by coordinate values of L*a*b* color space, which is obtained through the conversion by the first conversion means 6031, is fed to the third conversion means 6033. In the third conversion means 6033, the second coordinates conversion definition (printer profile) 6024*a*, which is read from the definition storage section 602 and fed to the color conversion section 603, is referred to so that image data on L*a*b* color space entered to the third conversion means 6033 is converted into image data defined by coordinate values of RGB color space. The image data defined by coordinate values of RGB color space, which is obtained through the conversion by the third conversion means 6033, is fed to the first composition means 6035.

On the other hand, a spot color name is fed to the second conversion means 6032. In the second conversion means 6032, the spot color and coordinates conversion definitions 6022*a*, which is read from the definition storage section 602 and fed to the color conversion section 603, is referred to so that the spot color name fed to the second conversion means 6032 is converted into coordinate values of L*a*b* color space. The coordinate values of L*a*b* color space, which is representative of the spot color, is fed to the fourth conversion means 6034. In the fourth conversion means 6034, in a similar fashion to that of the third conversion means 6033, the second coordinates conversion definition (printer profile) 6024*a* is referred to so that image data on L*a*b* color space representative of the spot color is converted into coordinate values of RGB color space. The coordinate values of RGB color space representative of the spot color, which is obtained through the conversion by the fourth conversion means 6034, is fed to the first composition means 6035.

Fed to the first composition means 6035 are the spot color image data (dot % data) as well as the image data of RGB obtained through the conversion by the third conversion means 6033 and the RGB coordinate values of the spot color. In the first composition means 6035, the coordinate composition definition 6023, which is read from the definition storage section 602 and fed to the color conversion section 603, is referred to so that RGB coordinate values of dot % data of the spot color, which is determined by the RGB coordinate values of the solid of the spot color entered from the fourth conversion means 6034 and dot % of the spot color represented by the spot color image data, and RGB coordinate values of image data entered from the third conversion means 6033 are synthesized to generate image data defined by coordinate values of RGB color space, for a proof image output.

In this manner, the image data of RGB obtained through the color conversion by the color conversion section 603 is transmitted to the printer 60*a* (cf. FIG. 1), as mentioned above, to output a proof image based on the image data of RGB.

As mentioned also in the embodiments of the color conversion method of the present invention, the process color and the spot color are subjected to a color conversion through individual conversion systems and then synthesized. Thus, it is possible to perform a color conversion suitable for the process color and the spot color and thereby obtain a proof image excellent in color reproduction with respect to spot color as well as the process color. Further, according to the color conversion method shown in FIG. 13, what is needed to be added or altered when a proofer for outputting a proof image is added or altered is only the second coordinates conversion definition. This makes it possible to reduce a load of the data management. Further, it is possible reduce an increment of memory capacity of the definition storage section 602, resulting from addition of the proofer.

Figure 14:
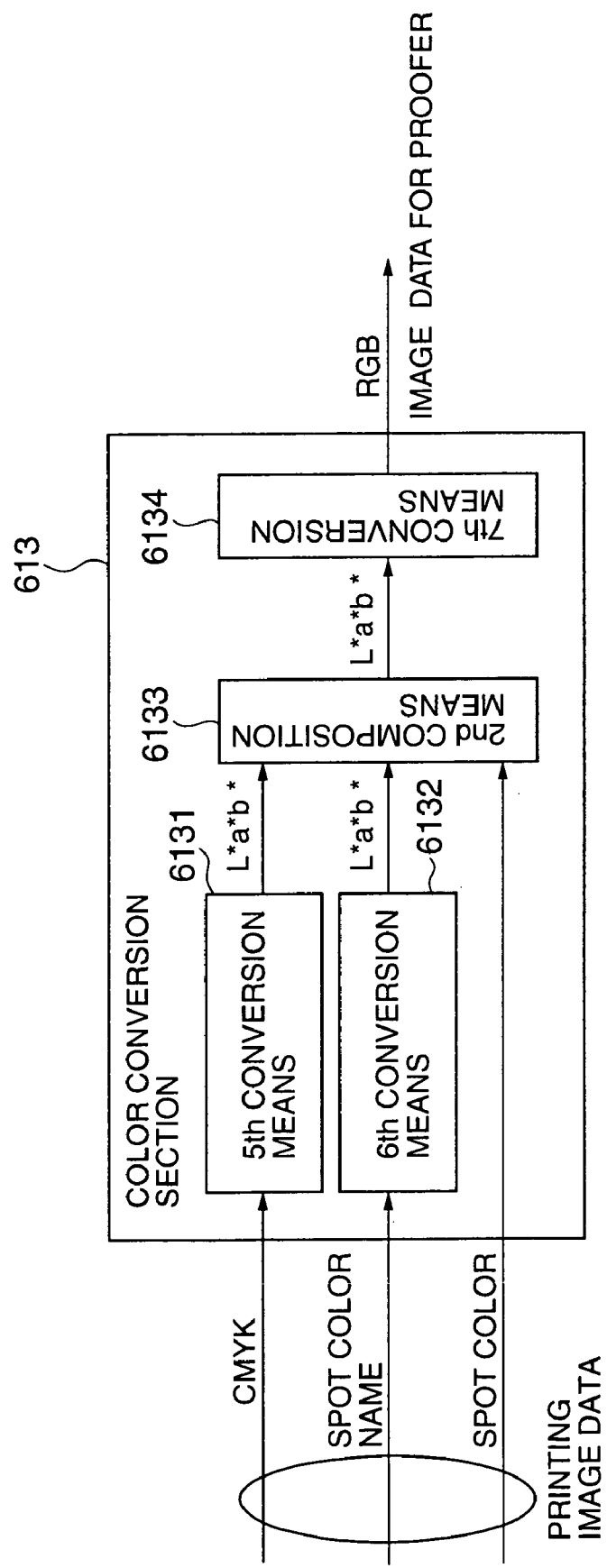
FIG. 14 is a functional block diagram of a color conversion section of the second embodiment of a color conversion apparatus according to the present invention.

FIG. 14 is a functional block diagram of a color conversion section of the second embodiment of a color conversion apparatus according to the present invention. The structure of the designation section and the definition storage section is the same as those in the first embodiment shown in FIG. 13, and thus redundant description will be omitted. It is noted that in the second embodiment shown in FIG. 14, the coordinate composition definition 6023 stored in the definition storage section 602 shown in FIG. 13 is one defining coordinates composition on L*a*b*.

A color conversion section 613 shown in FIG. 14 comprises a fifth conversion means 6131, a sixth conversion means 6132, a second composition means 6133 and a seventh conversion means 6134.

The fifth conversion means 6131 and the sixth conversion means 6132 are the same as the first conversion means 6031 and the second conversion means 6032 of the color conversion section 603 of the first embodiment shown in FIG. 13 in their function, respectively. And thus the redundant description will be omitted.

Fed to the second composition means 6133 are the image data of L*a*b* obtained through the conversion by the fifth conversion means 6131, coordinate values on L*a*b* color space of the spot color, which is obtained through the conversion by the sixth conversion means 6132, and spot color image data (dot % data). In the second composition means 6133, the coordinate composition definition, which performs coordinates composition on the L*a*b* color space, is referred to so that L*a*b* coordinate values of the spot color image data, which is determined by L*a*b* coordinate values of the solid of the spot color entered from the sixth conversion means 6132 and dot % of the spot color represented by the spot color image data, and L*a*b* coordinate values of process image data entered from the fifth conversion means 6131 are synthesized to generate image data (on L*a*b* color space) for a proof image output. The image data defined by the coordinate values of L*a*b* color space for a proof image output is fed to the seventh conversion means 6134. In the seventh conversion means 6134, the second coordinates conversion definitions 6024a is referred to so that image data of L*a*b* for a proof image output is converted into image data of RGB for a proof image output.

The image data of RGB for a proof image output is transmitted to the printer 60a shown in FIG. 1. In the printer 60a, a proof image based on the image data of RGB thus transmitted is outputted.

While it is acceptable that the second composition means 6133 in the second embodiment shown in FIG. 14 is one for directly performing a coordinates synthesis in L*a*b* color space, in a similar fashion to that of the embodiment of the color conversion method explained referring to FIG. 11, it is acceptable that the second composition means 6133 is one in which coordinate values of L*a*b* color space is once converted into coordinate values of XYZ color space, coordinates synthesis is performed on XYZ color space, and then again coordinate values of XYZ color space is converted into coordinate values of L*a*b* color space.

Also in the second embodiment shown in FIG. 14, the process color and the spot color are individually subjected to the color conversion and then synthesized. Thus, also with respect to the spot color, it is possible to expect an excellent color reproduction. It is similar to that of the first embodiment also in the point that an increment of the memory capacity resulted from the printer for a proof image output may be reduced.

FIG. 15 is a functional block diagram of a color conversion section of the third embodiment of a color conversion apparatus according to the present invention. The structure of the designation section and the definition storage section in the third embodiment is the same as those in the first embodiment shown in FIG. 13, and thus redundant description will be omitted.

A color conversion section 623 shown in FIG. 15 comprises a coordinates conversion definition construction means 6231, an eighth conversion means 6232, a ninth conversion means 6233, a tenth conversion means 6234 and a third composition means 6235. The ninth conversion means 6233, tenth conversion means 6234 and the third composition means 6235 are the same as the second conversion means 6032, the fourth conversion means 6034, and the first composition means 6035 of the color conversion section 603 of the first embodiment shown in FIG. 13 in their function, respectively. And thus the redundant description will be omitted.

In the coordinates conversion definition construction means 6231, as explained referring to FIG. 6, the first coordinates conversion definition (print profile) 6021a, which is read out from the definition storage section 602 and fed to the color conversion section 623, is combined with the second coordinates conversion definition (printer profile) 6024a, so that there is constructed the third coordinates conversion definition for converting coordinate values of CMYK color space into coordinate values of RGB color space directly without passing through L*a*b* color space.

Process color image data for CMYK is fed to the eighth conversion means 6232. In the eighth conversion means 6232, the third coordinates conversion definition constructed by the coordinates conversion definition construction means 6231 is referred to so that the entered process image data for CMYK is converted directly into image data for RGB.

In this manner, according to the third embodiment shown in FIG. 15, while there is a need to provide the coordinates conversion definition construction means 6231, and in addition, before the color conversion, to perform an arithmetic operation for constructing the third coordinates conversion definition, it is possible in the actual color conversion to convert the process color image data of CMYK to image data of RGB directly and thereby performing high speed color conversion.

With respect to a point that a color reproduction ability of spot color in the proof image is excellent and a point that an increment of a memory capacity, wherein a proofer is added, may be reduced, it is the same as that of the first embodiment shown in FIG. 13.

Incidentally, according to the above-mentioned embodiments, there are shown an example in which a printer having a color space of RGB is used as a proofer. But, according to the present invention, it is acceptable that a printer having a color space of CMYK and a display having a color space of RGB are adopted as a proofer.

As mentioned above, according to the present invention, it is adapted to a system in which there exist a plurality of types of proofers for outputting a proof image, and it is possible to maintain an accuracy of color reproduction of spot color at high degree.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A color conversion method of converting printing image data, which comprises process color image data defined by a coordinate value of a predetermined first color space, and spot color image data defined by a coordinate value of a characteristic direction, into image data defined by a coordinate value of a predetermined second color space, for a proofer for outputting a proof image in which an image obtained through printing of an image based on the printing image data in accordance with a predetermined printing condition is reproduced, said color conversion method comprising:

a printing condition conversion step associated with a printing condition, of converting the coordinate value of the first color space into coordinate values of a colorimetry color space which is device-nondependent;

a spot color reference step of converting a spot color name into the coordinate values of the colorimetry color space;

a proof condition conversion step associated with a proof condition, of converting the coordinate values of the colorimetry color space into coordinate values of the second color space; and a composition step of synthesizing, on the colorimetry color space or the second color space, image data defined by coordinate values of the colorimetry color space or the second color space, wherein the process color image data is converted, with image data defined by coordinate values of the colorimetry color space or the second color space, wherein the spot color name is converted;

wherein the printing image data, which comprises the process color image data defined by the coordinate value of the first color space, and the spot color image data defined by the coordinate value of the characteristic direction, is converted into the image data defined by the coordinate value of the second color space, for the proofer.

2. A color conversion method according to claim 1, wherein said composition step is a step of synthesizing different types of image data on the second color space, of the printing image data, the process color image data defined by the coordinate value of the first color space is converted into image data defined by the coordinate values of the colorimetry color space in said printing condition conversion step, and the image data defined by the coordinate values of the colorimetry color space thus obtained through the conversion is further converted into image data defined by the coordinate value of the second color space in said proof condition conversion step, the spot color name is converted into the coordinate values of the colorimetry color space in said spot color reference step, and the coordinate values of the colorimetry color space thus obtained through the conversion is converted into the coordinate value of the second color space in said proof condition conversion step, and in said composition step, the image data defined by the coordinate value of the second color space, for the proofer, is synthesized in accordance with the image data defined by the coordinate value of the second color space, after conversion by said proof condition conversion step, the coordinate value of the second color space corresponding to the spot color, after conversion by said proof condition conversion step, and the spot color image data of the printing image data.

3. A color conversion method according to claim 2, wherein prior to conversion of the printing image data into the image data for the proofer, there is produced a process color conversion step in which the coordinate value of the first color space is directly converted into the coordinate value of the second color space in accordance with said printing condition conversion step and said proof condition conversion step, in conversion of the process color image data of the printing image data, there is applied said process color conversion step instead of individual application of both said printing condition conversion step and said proof condition conversion step, so that of the printing image data, the process color image data defined by the coordinate value of the first color space is converted into image data defined by the coordinate value of the second color space before synthesized with the spot color image data.

4. A color conversion method according to claim 1, wherein said composition step is a step of synthesizing different types of image data on the colorimetry color space, of the printing image data, the process color image data defined by the coordinate value of the first color space is converted into image data defined by the coordinate values of the colorimetry color space in said printing condition conversion step, the spot color name is converted into the coordinate values of the colorimetry color space in said spot color reference step, in said composition step, the image data defined by the coordinate values of the colorimetry color space, for the proofer, is synthesized in accordance with the image data defined by the coordinate values of the colorimetry color space, after the conversion by said printing condition conversion step, the coordinate values of the colorimetry color space corresponding to the spot color, after the conversion by said spot color reference step, and the spot color image data of the printing image data, and the image data defined by the coordinate values of the colorimetry color space, for the proofer, which is synthesized by said composition step, is converted by said proof condition conversion step into the image data defined by the coordinate value of the second color space, for the proofer.

5. A color conversion method according to claim 1, wherein the process color image data and the spot color image data are separately converted prior to being synthesized.

6. A color conversion method according to claim 1, wherein said first color space comprises a CMYK color space, said colorimetry color space comprises a L*a*b* color space, and said second color space comprises an RGB color space.

7. A color conversion method according to claim 1, wherein the converting of the spot color name into coordinate values of the colorimetry color space occur concurrently with printing condition conversion into coordinate values of the colorimetry color space.

8. A color conversion apparatus for converting printing image data, which comprises process color image data defined by a coordinate value of a predetermined first color space, and spot color image data defined by a coordinate value of a characteristic direction, into image data defined by a coordinate value of a predetermined second color space, for a proofer for outputting a proof image in which an image obtained through printing of an image based on the printing image data in accordance with a predetermined printing condition is reproduced, said color conversion apparatus comprising:

a definition storage section for storing a first coordinates conversion definition associated with a printing condition, defining an association between the coordinate value of the first color space and the coordinate values of a colorimetry color space which is device-nondependent, a spot color and coordinates conversion definition defining an association between a spot color name and the coordinate values of the colorimetry color space, a second coordinates conversion definition defining an association between the coordinate values of the colorimetry color space and the coordinate value of the second color space, and a coordinates composition definition defining an association among coordinate values of the colorimetry color space or the second color space, wherein the process color image data is converted, on the colorimetry color space or the second color space, coordinate values of the colorimetry color space or the second color space, wherein the spot color name is converted, and a set of coordinate values wherein said two types of coordinate values are synthesized; and a color conversion section for converting the printing image data, which comprises the process color image data defined by the coordinate values of the first color space and the spot color image data defined by the coordinate values of the characteristic direction, into the image data defined by the coordinate value of the second color space, for the proofer, referring to said first coordinates conversion definition, said spot color and coordinates conversion definition, said second coordinates conversion definition, and said coordinates composition definition, which are stored in said definition storage section.

9. A color conversion apparatus according to claim 8, wherein said coordinates composition definition, which is stored in said definition storage section, defines an association between said two types of coordinate values of the second color space and said set of coordinate values, and said color conversion section comprises:

first conversion means for converting the process first color space, of the printing image data, into image data defined by the coordinate values of the colorimetry color space, referring to said first coordinates conversion definition;

second conversion means for converting the spot color name into the coordinate values of the colorimetry color space, referring to said spot color and coordinates conversion definition;

third conversion means for converting the image data defined by the coordinate values of the colorimetry color space, after conversion by said first conversion means, into image data defined by the coordinate value of the second color space, referring to said second coordinates conversion definition;

fourth conversion means for converting the coordinate values of the colorimetry color space, associated with the spot color, after conversion by said second conversion means, into the coordinate value of the color image data defined by the coordinate value of the second color space, referring to said second coordinates conversion definition;

first composition means for synthesizing the image data defined by the coordinate value of the second color space, for the proofer, in accordance with the image data defined by the coordinate value of the second color space, after conversion by said third conversion means, the coordinate value of the second color space corresponding to the spot color, after conversion by said fourth conversion means, and the spot color image data of the printing image data, referring to said coordinates composition definition.

10. A color conversion apparatus according to claim 8, wherein said coordinates composition definition, which is stored in said definition storage section, defines an association between said two types of coordinate values of the colorimetry color space and said set of coordinate values, and said color conversion section comprises:

fifth conversion means for converting the process color image data defined by the coordinate value of the first color space, of the printing image data, into image data defined by the coordinate values of the colorimetry color space, referring to said first coordinates conversion definition;

sixth conversion means for converting the spot color name into the coordinate values of the colorimetry color space, referring to said spot color and coordinates conversion definition;

second composition means for synthesizing the image data defined by the coordinate values of the colorimetry color space, for the proofer, in accordance with the image data defined by the coordinate values of the colorimetry color space, after conversion by said fifth conversion means, the coordinate values of the colorimetry color space corresponding to the spot color, after conversion by said sixth conversion, and the spot color image data of the printing image data, referring to said coordinates composition definition; and seventh conversion means for converting the image data defined by the coordinate values of the colorimetry color space, for the proofer, which is synthesized by said second composition means, into the image data defined by the coordinate value of the second color space, for the proofer, referring to said second coordinates conversion definition.

11. A color conversion apparatus according to claim 8, wherein said coordinates composition definition, which is stored in said definition storage section, defines an association between said two types of coordinate values of the colorimetry color space and said set of coordinate values, and said color conversion section comprises:

coordinates conversion definition construction means for constructing a third coordinates conversion definition to directly associate the coordinate value the first color space with the coordinate value of the second color space in accordance with said first coordinates conversion definition and said second coordinates conversion definition;

eighth conversion means for converting the process color image data defined by the coordinate value of the first color space, of the printing image data, into image data defined by the coordinate values of the second color space, referring to said third coordinates conversion definition;

ninth conversion means for converting the spot color name into the coordinate values of the colorimetry color space, referring to said spot color and coordinates conversion definition;

tenth conversion means for converting the coordinate values of the colorimetry color space corresponding to the spot color, after conversion by said ninth conversion means, into the coordinate value of the second color space, referring to said second coordinates conversion definition; and third composition means for synthesizing the image data defined by the coordinate values of the second color space, for the proofer, in accordance with the image data defined by the coordinate values of the second color space, after conversion by said eighth conversion means, the coordinate values of the second color space corresponding to the spot color, after conversion by said ninth conversion, and the spot color image data of the printing image data, referring to said coordinates composition definition.

12. A color conversion definition storage medium storing a color conversion definition for converting printing image data, which comprises process color image data defined by a coordinate value of a predetermined first color space, and spot color image data defined by a coordinate value of a characteristic direction, into image data defined by a coordinate value of a predetermined second color space, for a proofer for outputting a proof image in which an image obtained through-printing of an image based on the printing image data in accordance with a predetermined printing condition is reproduced, said color conversion definition comprising:

a first coordinates conversion definition associated with a printing condition, defining an association between the coordinate value of the first color space and the coordinate values of a colorimetry color space which is device-nondependent;

a spot color and coordinates conversion definition defining an association between a spot color name and the coordinate values of the colorimetry color space;

a second coordinates conversion definition defining an association between the coordinate values of the colorimetry color space and the coordinate value of the second color space, said second coordinates conversion definition being associated with a proof condition; and a coordinates composition definition defining an association among coordinate values of the colorimetry color image data is converted, on the colorimetry color space or the second color space, coordinate values of the colorimetry color space or the second color space, wherein the spot color name is converted, and a set of coordinate values wherein said two types of coordinate values are synthesized.

* * * * *